United States Patent [19]

Westwood

[11] Patent Number: 5,686,193
[45] Date of Patent: Nov. 11, 1997

[54] MULTILAYERED SENDUST FILMS WITH A GAS-DOPED SENDUST SEED LAYER

[75] Inventor: John David Westwood, San Jose, Calif.

[73] Assignee: International Business Machines Corporation, Armonk, N.Y.

[21] Appl. No.: 594,359

[22] Filed: Jan. 30, 1996

Related U.S. Application Data

[63] Continuation of Ser. No. 303,276, Sep. 8, 1994, abandoned, which is a continuation of Ser. No. 4,023, Jan. 15, 1993, abandoned.

[51] Int. Cl.$^6$ ...................................................... H01F 1/00
[52] U.S. Cl. ........................... 428/611; 428/641; 428/650; 428/653; 428/654; 428/681; 428/682
[58] Field of Search ................................ 428/650, 641, 428/621, 632, 635, 636, 637, 652, 653, 654, 681, 682

[56] References Cited

U.S. PATENT DOCUMENTS

| | | | |
|---|---|---|---|
| 4,639,806 | 1/1987 | Kira et al. | 360/113 |
| 4,671,828 | 6/1987 | Yamauchi et al. | 148/309 |
| 4,683,012 | 7/1987 | Yamauchi et al. | 148/301 |
| 4,707,417 | 11/1987 | Hayakawa et al. | 428/630 |
| 4,780,779 | 10/1988 | Pisharody et al. | 360/120 |
| 4,897,318 | 1/1990 | Sakakima et al. | 428/635 |
| 4,918,554 | 4/1990 | Bajorek et al. | 360/113 |
| 4,945,397 | 7/1990 | Schuetz | 428/693 |
| 5,020,212 | 6/1991 | Michijima et al. | 29/603 |
| 5,103,553 | 4/1992 | Mallary | 29/603 |
| 5,147,732 | 9/1992 | Shiroishi et al. | 428/668 |
| 5,231,555 | 7/1993 | Itoh et al. | 360/127 |

FOREIGN PATENT DOCUMENTS

| | | |
|---|---|---|
| 851046375 | 4/1985 | European Pat. Off. . |
| 3203008 | 9/1991 | Japan . |

OTHER PUBLICATIONS

M. Takahashi et al., "Magnetic Properties of FeSiAl Sputtered Films", IEEE Transaction Journal of Magnetics in Japan, vol. 3, No. 2, Feb. 1988, pp. 180–186.

M. Takahashi et al., "Local Anistropy Fluctuation on the Permeability of Sputtered Sendust Alloy Films", IEEE Transaction Journal on Magnetics in Japan, vol.4, No.10, Oct. 1989, pp. 598–607.

M. Takahashi et al., "Megnetstriction of Fe–Al–Si Alloy Sputtered Films", Sep. 1987, IEEE Transactions on Magnetics, pp. 3068–3070.

T. Kumura et al., "Properties of Fe–Al–Si–N Thin Films Prepared by $N_2$ Reactive Sputtering", J.App.Physics, Apr. 1987, vol.61, No.8, pp. 3844–3846.

M. Takahashi et al., "Magnetic Properties of Fe–Si–Al Sputtered Films", IEEE Transaction Journal on Magnetics in Japan, vol. 3, No.2, Feb. 1988, pp. 180–186.

*Primary Examiner*—David A. Simmons
*Assistant Examiner*—Linda L. Gray
*Attorney, Agent, or Firm*—Leslie G. Murray

[57] ABSTRACT

A layered magnetic structure with a seed layer on a substrate and a bulk layer on the seed layer. The seed layer is a gas-doped sendust layer with a thickness of 100–800 Å. The bulk layer is sendust with a thickness of 0.3–10.0 μm. The seed layer and the bulk layer have different weight compositions.

14 Claims, 8 Drawing Sheets

MULTILAYERED SENDUST FILMS WITH A GAS-DOPED SENDUST SEED LAYER

This application is a continuation of application Ser. No. 08/303,276, filed on Sep. 8, 1994, now abandoned, which is a continuation of application Ser. No. 08/004,023, filed on Jan. 15, 1993, now abandoned.

BACKGROUND OF THE INVENTION

The present invention relates generally to magnetoresistive read, inductive write magnetic transducers and, more particularly, laminated sendust films and a process for fabricating such films suitable for use as shields and pole pieces in magnetic transducers.

In the magnetic recording industry, the drive towards increased recording density has led to the requirement for magnetic storage media having narrower data recording tracks, lower track pitch, i.e., more tracks per inch, and greater linear recording density along the data tracks. In turn, increased recording density places an ever increasing demand on the devices employed to record (write) and read the recorded information. With the increased recording density capability, the trend is towards magnetic media requiring greater magnetic field strength to accomplish the recording of data. Similarly, read transducers having greater sensitivity and reduced vulnerability to noise and cross-talk. At the present time, the most likely candidate to meet these requirement appears to be a magnetic transducer including an inductive write head and a magnetoresistive (MR) read sensor or head.

In order for an MR read head to be capable of reading recorded data from a magnetic medium at these high recording densities, the MR sensing element must be incorporated in the gap between two magnetic shielding elements. For example, U.S. Pat. No. 4,639,806 to Kira et al discloses an MR read head including a shielded MR sensing element, and further discloses that the shield elements may be fabricated of high permeability magnetic material such as nickel-zinc ferrite (NiZnFe), manganese-zinc ferrite (MnZnFe), an iron-silicon-aluminum alloy generally referred to as sendust or a nickel-iron alloy generally referred to as permalloy.

Typically in a rotating rigid magnetic disk storage system, the read/write transducer is mounted on the trailing edge of a flying slider which supports the transducer above the surface of the rotating disk in close proximity to the magnetic media. Various elements of the transducer, such as the MR sensing element and its associated magnetic shields for the MR head and the magnetic pole tips and the nonmagnetic material disposed therebetween forming the magnetic gap for the inductive head, are exposed at the slider air bearing surface (ABS) imposing strict design and materials requirements. The read and write head elements which are exposed at the ABS are susceptible to physical damage when the slider encounters asperities or contaminants which may exist on the surface of the magnetic recording disks.

Among the different conductive materials exposed at the MR head ABS, the leading magnetic shield element presents the most serious problem since the shield provides a large volume of conductive material which can be easily scratched or smeared to form a short circuit path between the leading shield and MR sensing elements, thereby resulting in sensor shorting.

In the inductive write head, as well as in inductive heads designed to provide both the read and write functions, the magnetic yoke which forms the magnetic circuit for the inductive coil terminates at the slider ABS in a pair of opposed pole tips separated by a transducing gap. While the majority of the yoke structure is of relatively large dimensions, the pole tips are relatively narrow and thin thus requiring that they be fabricated of a material having a high saturation magnetization and high permeability. As noted above, since the pole tips and the gap are present at the inductive head ABS, it is also a requirement that the pole tip material be of sufficient hardness to minimize smearing and scratching caused by asperities or contaminants at the magnetic media surface. Also, since the geometry of the yoke and head structure allows the major portion of the yoke to be away from the ABS and thus not exposed to the harsh conditions present at the ABS, it is common practice to fabricate only the pole tips of materials having the properties required to survive at the ABS.

It is well-known in the prior art to utilize sendust as the material for both the leading shield in MR heads and for the pole tip structures in inductive heads. For example, U.S. Pat. No. 4,918,554 granted to Bajorek et al discloses a process for manufacturing a shielded MR sensor having the leading shield composed of sendust. Similarly, U.S. Pat. No. 4,780,779 granted to Pisharody et al discloses laminated sendust pole tip structures in an inductive magnetic head for video recording. Because of its excellent soft magnetic properties, thermal stability and mechanical integrity, hardness in particular, sendust alloys (Si: approximately 9.6%, Al: approximately 5.4%, Fe: approximately 85%) in bulk form is a preferred choice for shield elements and pole tip structures in MR/inductive thin film heads and for core material in metal-in-gap (MIG) ferrite heads. On the other hand, sendust films having good anisotropic properties and desirable mechanical properties such as magnetostriction tend to be very difficult to fabricate. Various aspects of this problem have been explored and and solved. For example, U.S. Pat, No. 4,897,318 granted to Sakakima et al discloses laminated structures of FeSi alloy films and sendust films wherein the magnetostriction coefficient is controlled to provide a high wear resistance and a high saturation magnetization. Japanese Application No. 1-342595, Publication No. 3-203008 published Sep. 4, 1991, discloses a laminated sendust structure in which a chromium (Cr) seed layer is utilized to orient the structure of subsequent sendust layers to provide improved soft magnetic characteristics. European Patent No. 0 159 028 B1, European Application No. 85104637.5 published Oct. 23, 1985, discloses thin films of a sendust-based alloy uniformly doped with a specified amount of oxygen (O) and having improved magnetic permeability and hardness.

The magnetic properties of sendust thin films of particular importance to MR and inductive head structures, such as magnetostriction, anisotropy field and coercivity, for example, strongly depend on the composition of the sendust material. Utilizing present deposition processes, films having good anisotropy field and magnetically soft characteristics can be obtained over only a relatively narrow composition range for sendust alloys.

SUMMARY OF THE INVENTION

It is therefore the principal object of the present invention to provide laminated magnetic sendust structures in which the desirable magnetic properties of the structures are optimized over a relatively wide range of compositions for the sendust material.

In accordance with the principles of the present invention, a preferred embodiment of a multilayered thin film structure comprises a thin seed layer of sendust alloy having a specified composition and one or more subsequently deposited layers of bulk sendust alloy material having a composition which can vary over a relatively large range (by percentage weight) for each of the component elements.

A second preferred embodiment of the multilayered thin film sendust structure according to the present invention comprises a seed layer having a specified composition consisting of a multilayered structure having an alternating sequence of at least one thin layer of nitrogen ($N_2$) doped sendust and at least one layer of non-doped sendust, and a layer of bulk sendust alloy material deposited over the seed layer structure. Nitrogen doping is accomplished by periodically introducing a controlled partial $N_2$ pressure into the argon (Ar) environment during the deposition process.

Use of the seed layer in the multilayered sendust films of the present invention provides improved anisotropic field and magnetic properties for the bulk sendust films having compositions outside the relatively narrow range where such properties have been obtained in the prior art. The enlarged range of material composition allows for optimizing desired magnetic properties of the sendust structures for reducing shield noise in MR head applications compared to prior art sendust shield structures. Further, multilayered sendust films of the present invention provide increased high frequency performance and saturation induction relative to in inductive write head applications relative to prior art sendust and permalloy materials.

BRIEF DESCRIPTION OF THE DRAWING

The foregoing and other objects, features and advantages of the present invention will be apparent from the following detailed description of the preferred embodiments of the invention, reference being made to the accompanying drawing, in which like reference numerals indicate like parts and in which.

DESCRIPTION OF THE PREFERRED EMBODIMENT

Figure 1:
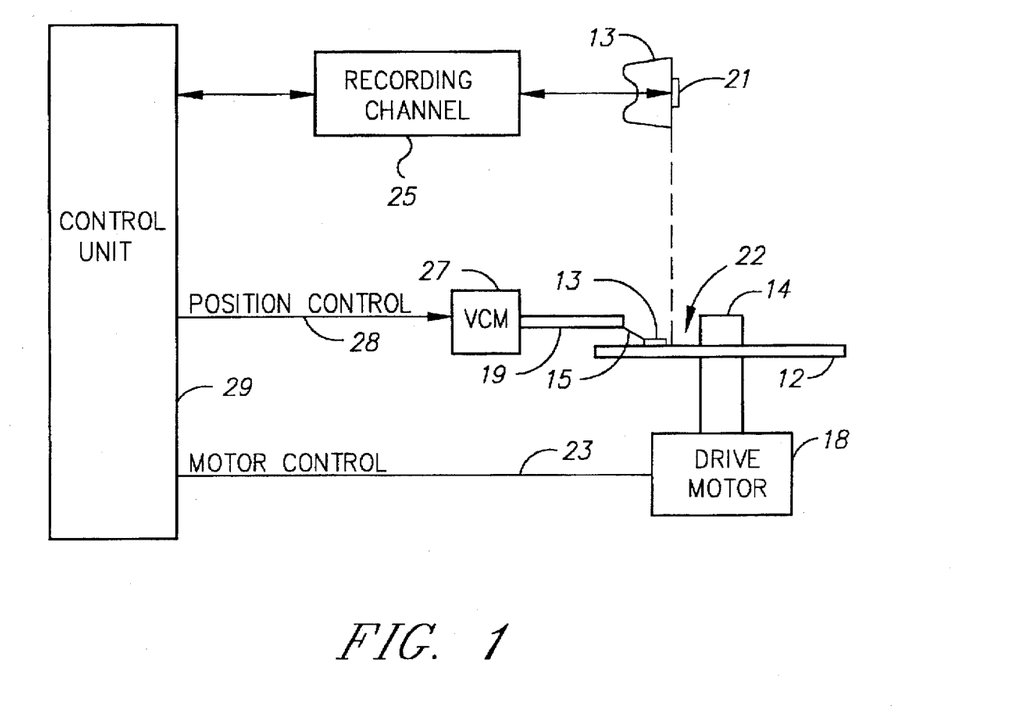
FIG. 1 is a simplified block diagram of a magnetic disk storage system embodying the present invention.
Figure 2:
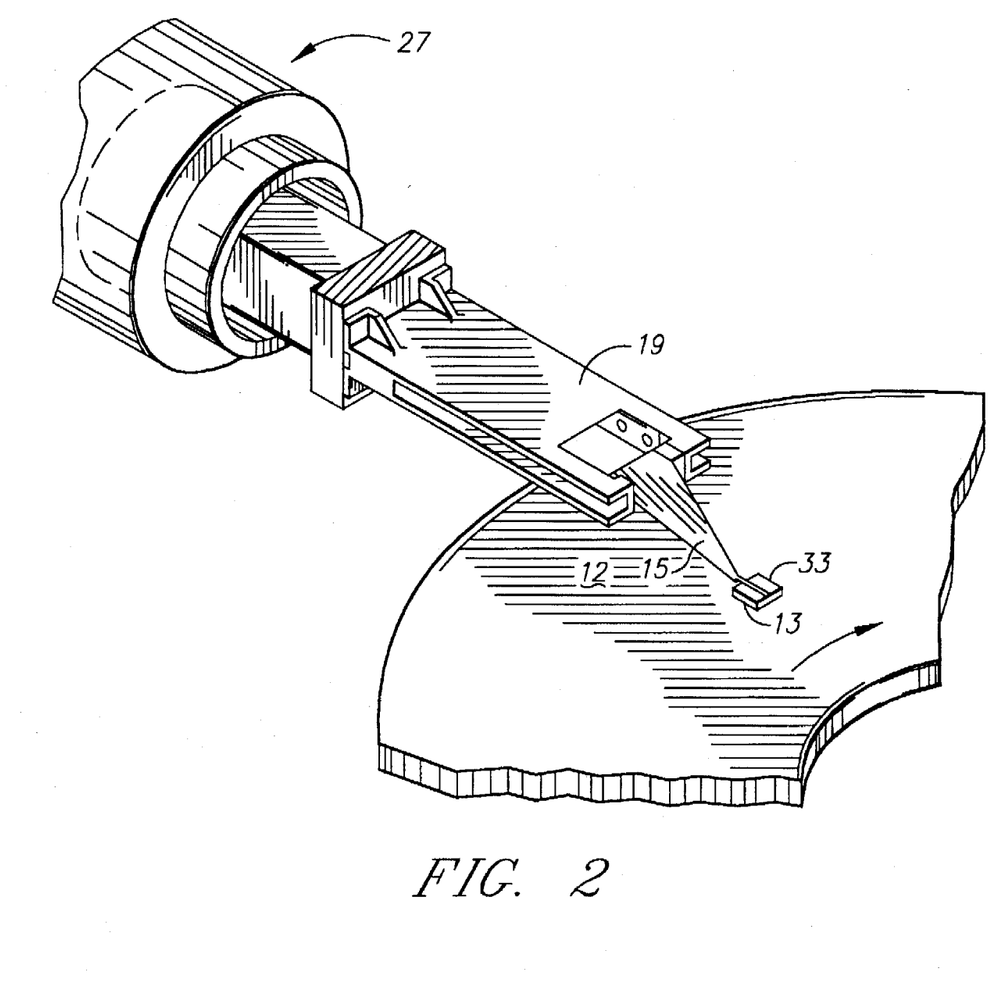
FIG. 2 is a view in perspective of the disk drive actuator of the system shown in FIG. 1 illustrating the relationship between the magnetic transducer and the magnetic storage medium.
Figure 3:
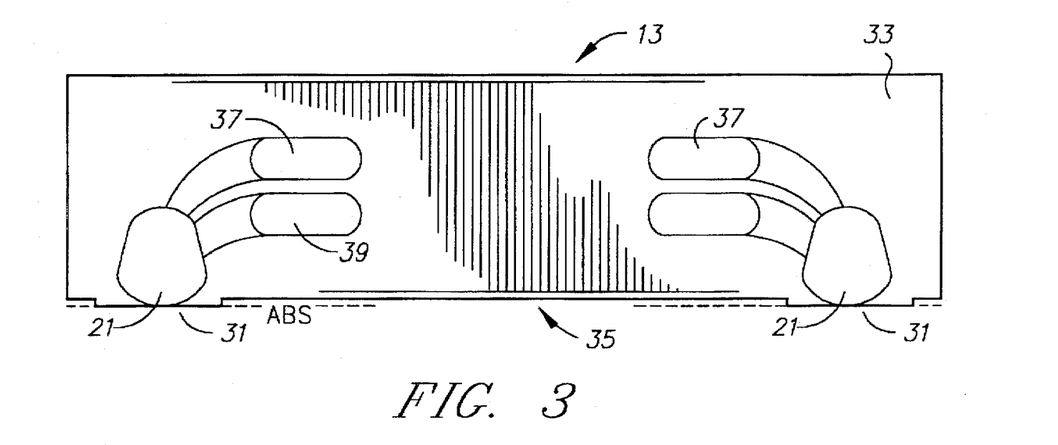
FIG. 3 is an elevation view of the trailing side of the slider of FIG. 2 illustrating the placement of the magnetic transducers thereon.

Although the present invention is described as embodied in a magnetic disk storage system as shown in FIGS. 1, 2 and 3, it will be apparent that the invention is also applicable to other magnetic recording systems such as a magnetic tape recording system, for example. At least one rotatable magnetic disk 12 is supported on a spindle 14 and rotated by a disk drive motor 18. The magnetic recording media on each disk is in the form of an annular pattern of concentric data tracks (not shown) on disk 12.

At least one slider 13 is positioned on the disk 12, each slider 13 supporting one or more magnetic read/write heads 21. As the disks rotate, the sliders 13 are moved radially in and out so that the heads 21 may access different portions of the disk surface 22 containing the data. Each slider 13 is attached to an actuator arm 19 by means of a suspension 15. The suspension 15 provides a slight spring force which biases the slider 13 against the disk surface 22. Each actuator arm 19 is attached to an actuator means 27. The actuator means shown in FIG. 1 is a voice coil motor (VCM). The VCM is a coil moveable within a fixed magnetic field, and the direction and velocity of the coil movements is controlled by the current supplied.

FIG. 2 is a perspective view of the disk storage system shown in FIG. 1 illustrating the utilization of a linear actuator 27 for accessing the slider 13 and its associated magnetic transducers or heads 21 data tracks on the magnetic disk 12. During operation of the disk storage system, the rotation of the disk 12 generates an air bearing between the slider 13 and the disk surface 22. The air bearing thus counterbalances the slight spring force of the suspension and supports the slider 13 off the disk surface by a small, substantially constant spacing during operation.

FIG. 3 is an elevation view of the trailing edge 33 of the slider 13 illustrating the structure of the slider and placement of the transducers 21 on the slider. The lower surface of the slider 13 is supported above and in close proximity to the surface of the magnetic disk 12. The slider lower surface is patterned on machined with the appropriate topology forming an air bearing surface (ABS) to generate a sufficient lift or pressure profile to provide the desired flying characteristics. In a typical design, a transducer 21 is deposited or other formed on the surface of the rear or trailing edge 33 of the slider on on each ABS rail 31 so that the read and write sensors are disposed at the ABS in a transducing relationship with the surface of the magnetic disk 12. Each transducer 21 includes a pair or more of output conductors 37 and 39 for connection of electrical signals to and from the transducers 21.

The various components of the disk storage system are controlled in operation by signals generated by control unit 29, such as access control signals and internal clock signals, and which includes logic control circuits, storage means and a microprocessor. The control unit 29 generates control signals to control various system operations such as motor control signals on line 23 and head position control signals on line 28. The control signals on line 28 provide the desired current profiles to optimally move and position a selected slider 13 to the desired data track on the associated disk 12. Read and write signals are communicated to and from read/write heads 21 by means of recording channel 25.

The above description of a typical magnetic disk storage system, and the accompanying illustration of it in FIGS. 1, 2 and 3 are for representation purposes only. It should be apparent that disk storage systems may contain a large number of disks and actuators, and each actuator may support a number of sliders. Similarly, while FIG. 2 illustrates the use of a linear actuator, disk drive systems incorporating a rotary actuator are also known.

As discussed above, because of its excellent magnetic and mechanical characteristics, SiAlFe alloys known as sendust are increasingly becoming the material of choice over such materials as NiFe (permalloy) for certain of the elements in magnetic transducers. Primarily because of its hardness, sendust is used for certain elements present at the transducer ABS. Additionally, because of the need for greater data storage densities, it is becoming increasingly important to optimize the magnetic characteristics of the sendust material. Multilayered thin films of sendust have been found to provide greatly improved magnetically soft characteristics compared to single-layered thin films of sendust.

Figure 4:
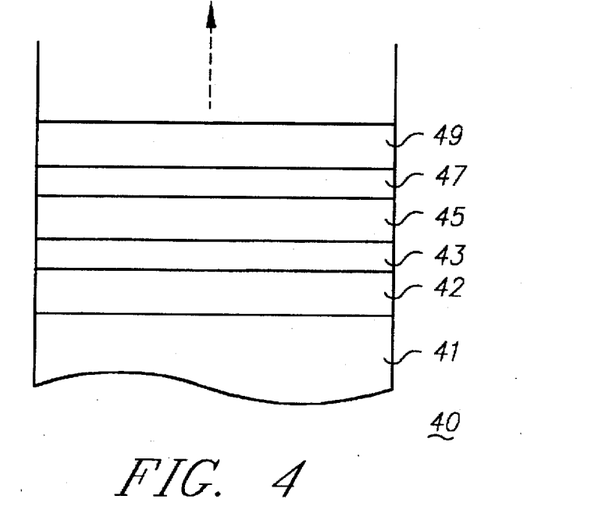
FIGS. 4, 5 and 6 are sectional views of multilayered magnetic structures for different preferred embodiments of the present invention.

Referring now to FIG. 4, a sectional view of a preferred embodiment of a multilayered sendust film according to the principles of the present invention is shown. The thin film structure 40 comprises an alternating sequence of layers of sendust 45 and 49 and layers of gas-doped sendust 43 and 47 deposited over a lapped alumina base layer 42 on a substrate 41. While only 2 pairs of layers are shown in the structure of FIG. 4, structures for various applications can include more than 100 pairs of doped-sendust/sendust layers.

For example, films of sendust 1.9 micrometers (um) thick were fabricated using a RF diode sputtering process in a Perkin-Elmer 4400 sputter deposition system. To produce nitrogen ($N_2$) doped and air doped films, a small partial pressure of $N_2$ or air, respectively, was introduced into the argon (Ar) process gas at periodic intervals during the deposition process. Since sendust films in the as-deposited state do not exhibit the superior soft magnetic properties required for desired transducer applications, after deposition of the films, the films are annealed at a temperature of 470 degrees C. for approximately 4.5 hours, as is known in the art. Table I below compares key BH loop properties for $N_2$-doped and air-doped multilayered films with those properties for conventional single-layer sendust films. In these films, sendust layers 145 Å thick alternate with gas-doped sendust layers 16 Å thick. In Table I, $H_{ch}$ and $H_{ce}$ are the hard and easy magnetic axis coercivities, $MU_i$ is the initial permeability, and $B_r/B_s$ is the ratio of the remnant induction to the saturation induction.

TABLE I

| DOPING GAS | $H_{ce}$ (Oe) | $H_{ch}$ (Oe) | $MU_i$ | $B_r/B_s$ |
| --- | --- | --- | --- | --- |
| $N_2$ | 0.20 | <0.01 | 6700 | <0.01 |
| Air | 0.14 | 0.02 | 6100 | 0.04 |
| none | 0.40 | 0.14 | 4500 | 0.42 |

Figure 7A:
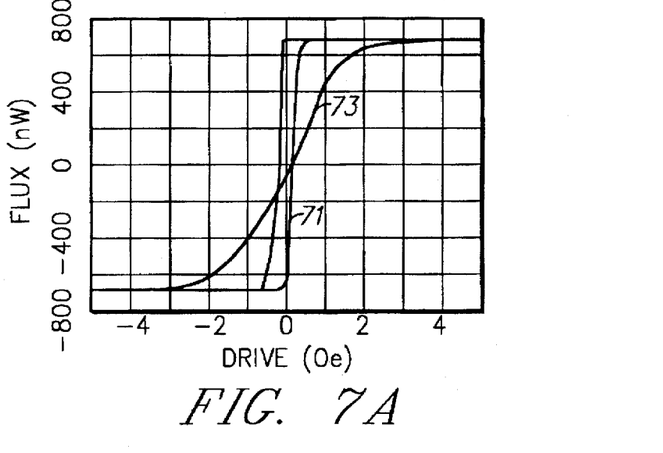
FIGS. 7A–7C are plots of the BH loops for the easy magnetic axis and the hard magnetic axis for the laminated multilayered sendust film of FIG. 4.
Figure 7B:
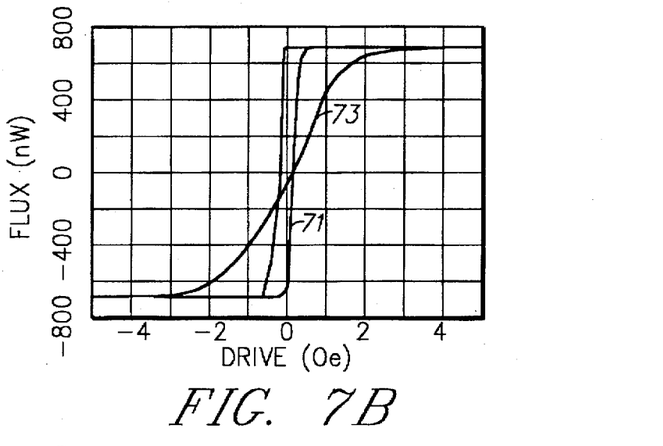
Figure 7C:
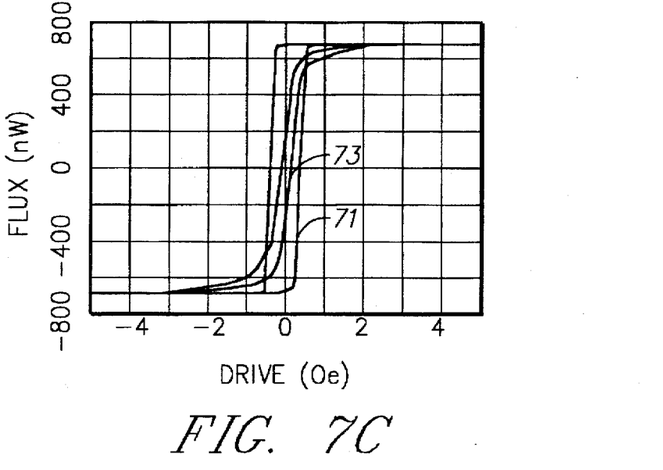

As shown in Table I, the gas-doped multilayered sendust films have significantly lower $H_{ce}$, $H_{ch}$ and $B_r/B_s$ values when compared to the values for conventional single-layer non-doped sendust films. FIGS. 7A, 7B and 7C are plots of the BH loop for the easy magnetic axis 71 and the hard magnetic axis 73 for $N_2$-doped, air-doped and undoped sendust films, respectively. The BH loops for the easy and hard magnetic axes for both the $N_2$- and air-doped sendust multilayered films show a significant improvement when compared to the BH loops for the non-doped sendust films.

The data shown in Table I and FIGS. 7A, 7B and 7C are for sendust films wherein the alloy composition, by weight, was nominally Si(9.6%)Al(6.0%)Fe(84.4%). The doping gas used was $N_2$ at a partial pressure of $7.0 \times 10^{-4}$ Torr for the $N_2$-doped sendust layers and air at a partial pressure of $7.0 \times 10^{-4}$ Torr for the air-doped sendust layers. The doping frequency and duration was 12 seconds every 120 seconds during the sputter deposition operation.

The data shown in Table I and FIGS. 7A, 7B and 7C and the improvement in soft magnetic properties obtained by the gas-doped multilayered technique is expected for alloy compositions relatively close to the sendust composition used to obtain this data. The gas can be air, $N_2$, $O_2$ or $H_2O$, or any combination of $N_2$, $O_2$ or $H_2O$. The data obtained for the air- and $N_2$-doped films suggest that $N_2$, $N_2/O_2$ and $N_2/O_2/H_2O$ gas mixtures produce generally similar effects, at least when $N_2$ is the primary constituent. The presence of $O_2$ or $H_2O$ is advantageous for optimizing a particular magnetic property. For providing optimum values for desired soft magnetic properties gas-doped sendust layer thicknesses and doping levels preferably are in the range of 10–1,000 Å and 1–10 atomic percent, respectively, while the non-doped layer has a thickness in the range of 20–10,000 Å.

While the gas-doped multilayered sendust films described above with reference to FIGS. 4 and 7A–7C provide improved magnetic properties for sendust alloy having a composition by weight in the range of Si(7.5 to 13.0%)Al (2.0 to 7.0%) and the remainder Fe, the important magnetic properties of thin films of sendust, such as magnetostriction, anisotropy field and coercivity, for example, depend strongly on the composition of the sendust alloy. For example, significant improvement in magnetic properties is exhibited by sendust films having a composition at or near Si(9.6%) Al(5.4%)Fe(85.0%). Sendust films having good anisotropy field and soft magnetic properties can be obtained over only a relatively narrow range of alloy compositions.

In a second preferred embodiment of the present invention, use of a seed layer of sendust having a composition which differs from the composition of a bulk layer of sendust overlaying the seed layer provides improved anisotropic field and soft magnetic properties for the bulk sendust layer for sendust compositions covering a relatively broad range outside the range of compositions for which good properties have been achieved in the prior art.

Referring now also to FIGS. 5, 6 and 8A–8E, FIG. 5 is a sectional view of a second preferred embodiment of a multilayered sendust film according to the principles of the present invention. The multilayered sendust film structure 50 comprises a seed layer 53 of a sendust alloy having a first composition deposited over a base layer 52 on a substrate 51. A bulk sendust layer 55 having a second composition is deposited over the seed layer 53. The sendust alloys utilized have a composition by weight in the range of Si(7.5 to 13.0%)Al(2.0 to 7.0%) and the remainder Fe. For example, multilayered sendust films including a seed layer 53 and a bulk layer 55 were deposited on a substrate 51/52 by an RF diode sputtering process in a Perkin-Elmer 4400 sputter deposition system. The substrate 51 comprised a ceramic material, 70 percent $Al_2O_3$–30 percent TiC, coated by a 3.5 um base layer 52 of sputtered alumina having a lapped surface. The seed layers 53 for the films 50 were deposited by co-sputtering from two sendust targets having a nominal composition, by weight, of Si(9.6%)Al(6.0%)Fe(84.4%) (composition A). After deposition of the seed layer 53, the bulk layers 55 were deposited from a single sendust target without breaking vacuum. For one group of films 50, the bulk layer 55 was deposited from a sendust target having a nominal composition, by weight, of Bi(12.0%)Al(4.5%)Fe (83.5%) (composition B). For a second group of films 50, the bulk layer 55 was deposited from a sendust target having a nominal composition, by weight, of Si(11.5%)Al(5.0%) Fe(83.5%) (composition C). Alternatively, the seed layer 53 can be uniformly doped by a gas, such as $N_2$ or $O_2$, by introducing a partial pressure of the doping gas into the deposition environment during deposition of the seed layer 53, as described above. The seed layer 53 thickness was in a range of 100–800 Å. The bulk layer 55 thickness was in a range of 0.3–10.0 um. In a particular preferred embodiment, the multilayered film 50 comprises a seed layer 53, 320 Å thick layer of sendust, composition A, uniformly doped with $N_2$ at a partial pressure of $7 \times 10^{-4}$ Torr during deposition, and a bulk layer 55 of negative lambda sendust, composition B, 1.85 um thick deposited on the seed layer. After deposition, the sendust films 50 were annealed at 470 degrees C. for 4.5 hours in a magnetic field filed under a $N_2$ atmosphere.

Figure 5:
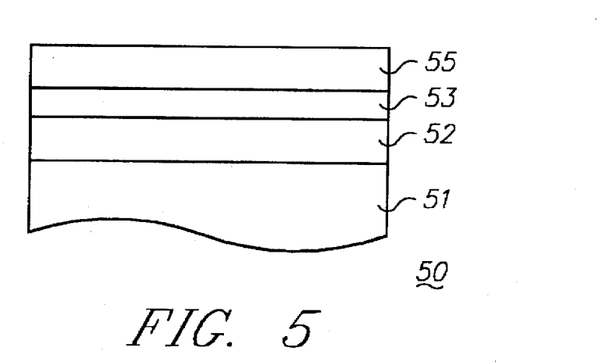
Figure 6:
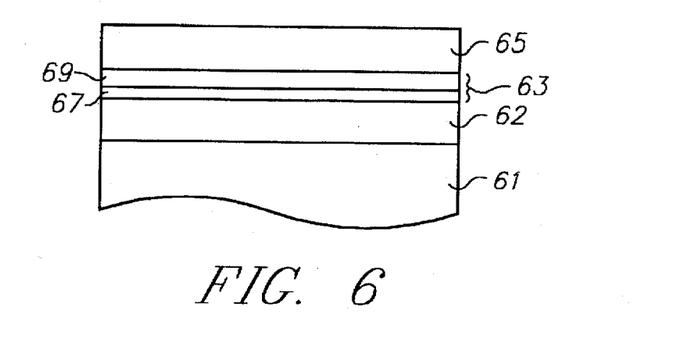

FIG. 6 is a sectional view of another preferred embodiment of the multilayered sendust film described with reference to FIG. 5. The multilayered sendust film 60 comprises a seed layer 63 of sendust having a first composition and a bulk layer 65 of sendust having a second composition deposited over the seed layer 63 wherein the seed layer 63 comprises alternating layers of gas-doped sendust 67 and sendust 69 as described above with reference to FIG. 4. For example, sendust films comprising a seed layer 63 and a bulk layer 65 were sputter deposited on a substrate 61 over a base layer 62 of alumina as described above for the films shown in FIG. 5. The above-described $N_2$ doping process was used to provide the seed layer 63 having alternating layers of $N_2$-doped sendust and non-doped sendust of sendust composition A. The $N_2$-doped layers 67 were 16 Å thick while the non-doped sendust layers 69 were 145 Å thick. In the seed layer 63, the doped and non-doped layers can have thicknesses in the range of 10 to 2,000 Å.

Table II provides typically obtained values for key magnetic properties of selected sendust films 50 and 60 having bulk layers 55, 65 of sendust composition B or C and seed layers 53, 63 of sendust composition A. In Table II, $H_{ce}$ and $H_{ch}$ are the easy axis and the hard axis coercivity, $MU_i$ and $MU_r$ are the initial and remnant permeability, and $B_r/B_s$ is the ratio of the remnant induction to the saturation induction on the hard magnetic axis. The column headed "$N_2$" specifies whether the seed layer comprised alternating $N_2$-doped and non-doped layers (as described above with reference to FIG. 6), a single, uniformly doped layer or a single non-doped layer. Properties of sendust films without a seed layer for each sendust composition used are also shown for comparison.

For the first group of sendust films, films 50, 60 having a bulk layer 55, 65 of sendust composition B, Table II shows that the sendust films having seed layers 53, 63 exhibit much better anisotropic properties (lower H and $B_r/B_s$) and soft magnetic properties (lower $H_{ce}$ and higher $MU_i$ and $MU_r$) compared to the sendust film with no seed layer. Among the sendust films having a seed layer, the seed layers 63 having alternating $N_2$-doped sendust layers 67 in a multilayered structure exhibit better anisotropic properties than those films having non-doped seed layers. Similarly, those films having a single layer uniformly-doped seed layer exhibit improved anisotropic properties when compared to the films having non-doped seed layers. For the uniformly-doped seed layer, it is clear that the resulting anisotropic properties are a function of the seed layer thickness with minimum values for $H_{ch}$ and $B_r/B_s$ occurring at a thickness of 320 Å.

Figure 8A:
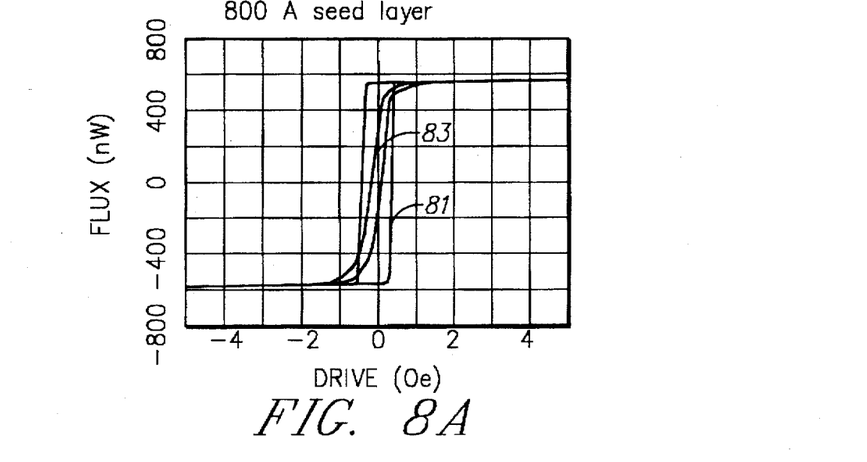
FIGS. 8A–8E are plots of the BH loops for the easy magnetic axis and the hard magnetic axis fop the laminated multilayered sendust films of FIGS. 5 and 6.
Figure 8B:
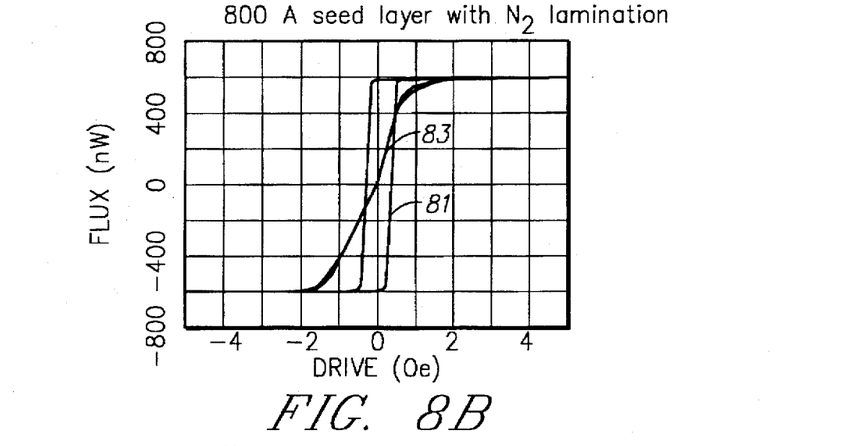
Figure 8C:
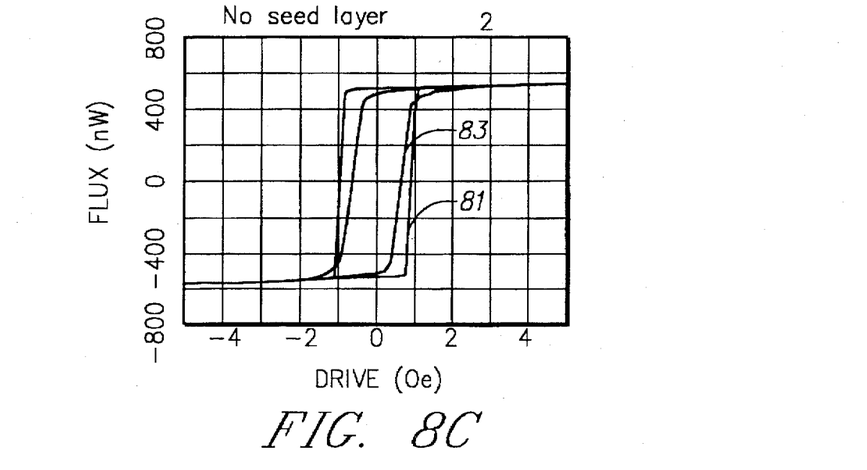

FIGS. 8A, 8B and 8C are plots of the easy magnetic axis 81 and the hard magnetic axis 83 for the sendust films having a bulk layer 55, 65 of sendust composition B for a film with a seed layer 53 of 800 Å thickness, for a film with a $N_2$-doped seed layer 63 of 800 Å thickness and for a film with no seed layer, respectively. The sendust films having a seed layer 63 comprising alternating layers of $N_2$-doped sendust 67 and non-doped sendust 69 provide the greatest overall improvement, for example, FIG. 8B shows that the BH loop for the hard magnetic axis is essentially closed.

Figure 8D:
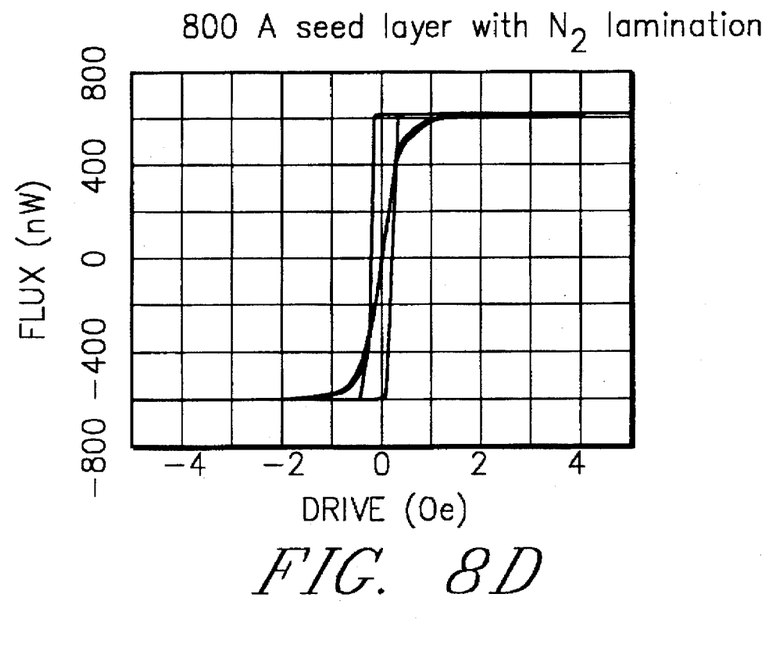
Figure 8E:
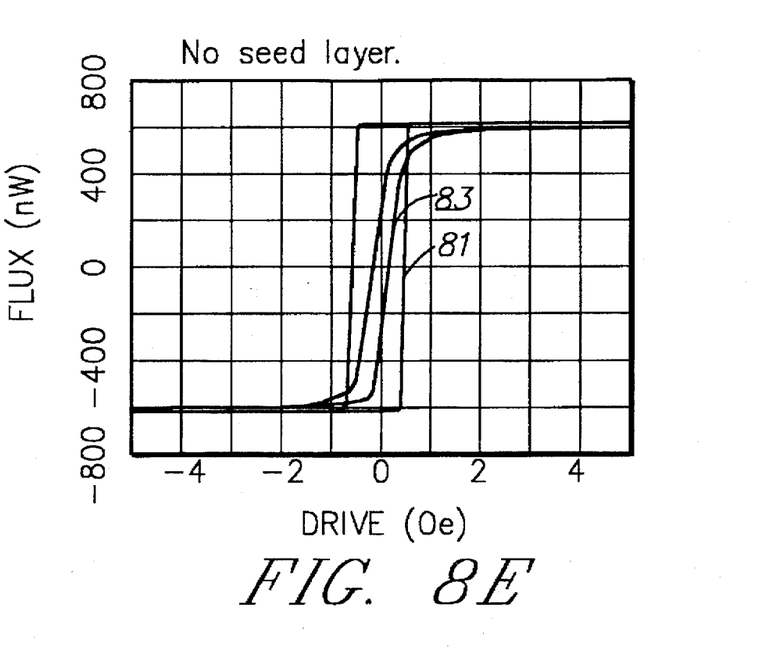

Similarly, for the second group of sendust films having a bulk layer 55, 65 with sendust composition C, as shown by Table II, the use of a uniformly or alternately $N_2$-doped seed layer 63 also provides greatly improved anisotropic and soft magnetic properties. For example, the values for $H_{ch}$ and $B_r/B_s$ are much lower compared to the values for the sendust film without a seed layer. FIGS. 8D and 8E are plots of the easy magnetic axis 81 and the hard magnetic axis 83 for the films having a bulk layer of sendust composition C for a $N_2$-doped seed layer 63 of 800 Å thickness and fop a film with no seed layer, respectively. The effect of the $N_2$- doped seed layer 63 in creating highly anisotropic sendust films is clearly illustrated when the BH loop plots of the hard magnetic axis 83 of FIGS. 8D and 8E are compared.

The final sendust film, having bulk sendust composition A and no seed layer, shown in Table II exhibits acceptable values for the anisotropic and soft magnetic properties required for MR head shield applications. By comparison,

TABLE II

| | SEED LAYER | | | BH LOOP PROPERTIES | | | | |
|---|---|---|---|---|---|---|---|---|
| TYPE | $N_2$ | THICKNESS (Å) | BULK LAYER TYPE | $H_{ce}$ (Oe) | $H_{ch}$ (Oe) | $B_r/B_s$ | $MU_i$ | $MU_i$ |
| A | N | 800 | B | 0.33 | 0.03 | 0.15 | 8500 | 24900 |
| A | N | 100 | B | 0.36 | 0.05 | 0.18 | 7200 | 23900 |
| A | Y* | 800 | B | 0.33 | 0.01 | 0.02 | 8500 | 14300 |
| A | Y* | 160 | B | 0.35 | 0.01 | 0.06 | 9700 | 18900 |
| A | Y** | 80 | B | 0.27 | 0.04 | 0.10 | 14100 | 21800 |
| A | Y** | 320 | B | 0.22 | 0.00 | 0.01 | 12300 | 14300 |
| A | Y** | 800 | B | 0.45 | 0.11 | 0.19 | 8100 | 10600 |
| | NO SEED LAYER | | B | 0.93 | 0.67 | 0.86 | 1000 | 1800 |
| A | Y* | 800 | C | 0.24 | 0.01 | 0.06 | 10100 | 18700 |
| A | Y** | 320 | C | 0.16 | 0.00 | 0.01 | 12700 | 15800 |
| | NO SEED LAYER | | C | 0.57 | 0.22 | 0.60 | 3200 | 14000 |
| B | Y** | 150 | B | 0.50 | 0.16 | 0.46 | 4900 | 23900 |
| B | Y** | 320 | B | 0.44 | 0.14 | 0.26 | 6800 | 14500 |
| | NO SEED LAYER | | A | 0.40 | 0.14 | 0.42 | 4500 | 20000 |

Y*: seed layer of alternating gas-doped and non-doped layers.
Y**: seed layer is a single, uniformly gas-doped layer.

the sendust film with no seed layer having the B composition exhibits relatively poor anisotropic properties, and the sendust film with no seed layer having the C composition exhibits properties which are marginally acceptable.

The use of a seed layer (of sendust composition A) for films of sendust composition B and C provides films having excellent anisotropic and soft magnetic properties for applications as shields in MR heads and pole tip material in inductive heads. Films fabricated from sputtering targets having compositions in the range near the composition of compositions B and C are particularly desirable because these compositions produce sendust films having negative and near-zero values of magnetostriction, respectively. While sendust films of composition A provide satisfactory anisotropic and soft magnetic properties with no seed layer, such films exhibit positive values of magnetostriction. For MR and inductive head applications, negative or near-zero magnetostriction films are required to maintain the most desirable magnetic domain configuration at the head ABS after it is lapped.

Figure 9:
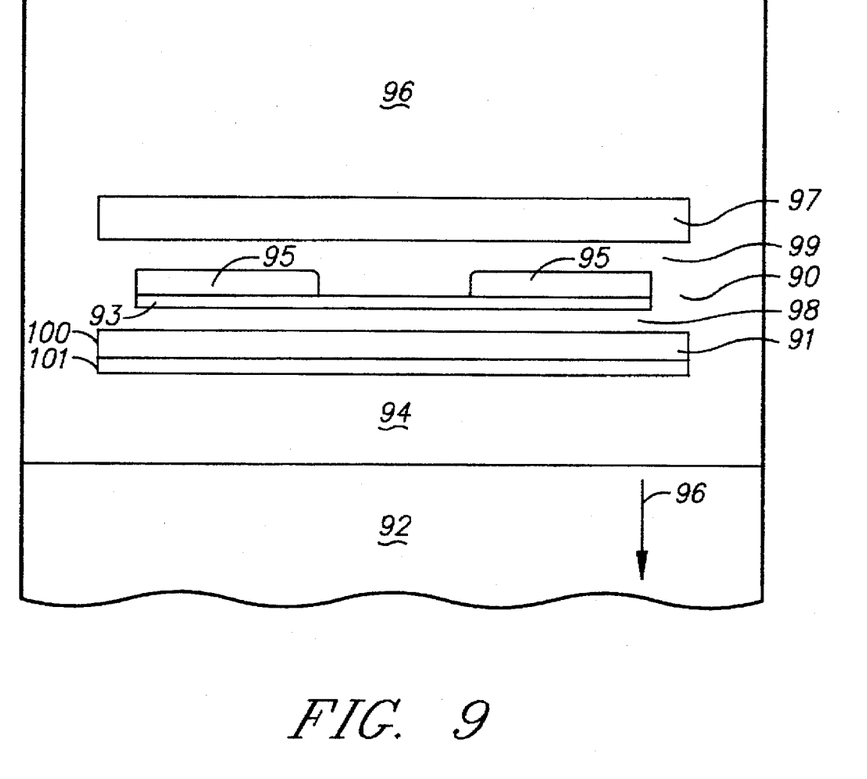
FIG. 9 is an elevation view of the air bearing surface of an MR head incorporating the multilayered magnetic structures according to the present invention.

Referring now to FIG. 9, a view of the ABS of an MR read sensor or head 90 incorporating a leading magnetic shield according to the principles of the present invention is shown. The MR read head assembly 90 comprises a first shield member 91 which is separated from a substrate 92 by a nonconductive layer 94 of alumina, for example. Substrate 92 typically comprises the body of a slider which supports the MR head on the trailing edge thereof as shown in FIG. 3. The first shield 91 is also referred to as the leading shield with respect to the relative motion between the slider and the magnetic storage medium surface as indicated by arrow 96. A first nonmagnetic gap layer 98 is then deposited over the first shield 91 to serve as a base layer for deposition of the MR sensor element 93. Although MR sensor element 93 is shown as having a single layer, it will be apparent to those skilled in the art that additional layers for properly biasing the sensor, for example, may also be included. The MR sensor element is contacted by electrically conductive leads 95, which are isolated from the second shield member 97 by a second nonmagnetic gap layer 99. A protective layer 96 is then deposited to a desired thickness at the trailing end of the head assembly.

The first shield 91 comprises a multilayered thin film structure including a seed layer 101 of sendust of a first composition and a bulk layer 103 of sendust of a second composition as described above with reference to FIG. 5. Alternatively, the seed layer 101 comprises multilayered structure of alternating layers of gas-doped sendust of said first composition and of non-doped sendust of said first composition as described above with reference to FIGS. 4 and 6. Because of temperature and other process limitations imposed on the MR head assembly 90 by the preferred materials for the MR sensor element 93, generally only the first shield 91 will be of sendust alloy while the second shield will be of a material having the required anisotropic field and soft magnetic properties such as permalloy, for example.

Figure 10:
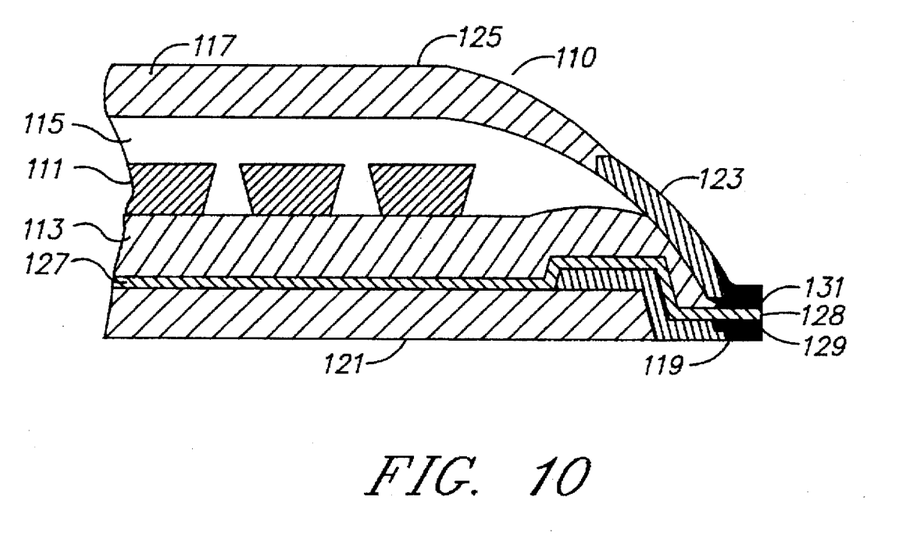
FIG. 10 is a section view of an inductive head incorporating the multilayered magnetic structures according to the present invention.

Referring now to FIG. 10, a side view in section of an inductive head 110 incorporating magnetic pole pieces according to the principles of the present invention is shown. The inductive head 110 comprises a flat conductor coil 111 plated in an elliptical pattern between two layers 113, 115 of insulating material such as alumina, for example. The coil 111 is inductively coupled to a magnetic yoke structure 117 having two composite layers each including a pole tip region and a back region and having a back gap region magnetically coupling the two layers which extends through the coil 111 (not shown). The lower layer has a pole tip portion 119 and a back region 121 and the upper layer has a pole tip portion 123 and a back region 125. In the pole tip region the yoke layers 119, 123 are separated by a gap material layer 127 that defines the transducing gap 128. The balance of the yoke layers are separated by the insulating layers 113, 115 in addition to the gap material layer 127 with the exception of the back gap region where the upper and lower yoke layers are in intimate contact.

As discussed above, in order to meet the requirements for high density recording, the dimensions of the pole tips in the gap 128 region at the ABS are relatively small providing a relatively small volume of magnetic material to carry the magnetic flux when compared to the remainder of the pole tips 119, 123 and the lower and upper back region layers 121, 125 remote from the gap 128 region. Thus, while the majority of the magnetic yoke structure 117 can be of any suitable magnetic material having appropriate magnetic properties, such as NiFe, NiFeCo or plain iron, for example, that portion of the pole tip regions 119, 123 at the gap 128 requires a material having a high saturation magnetization. Additional, since this portion of the pole tips are exposed at the ABS, the material used for the pole tips must posses sufficient hardness and other mechanical properties to eliminate or minimize physical damage from the environment at the ABS. In one embodiment of an inductive head according to the present invention, then, the pole tip regions 119 and 121 of the yoke structure comprise a multilayered structure consisting of alternating layers of gas-doped sendust and non-doped sendust as described above with respect to FIG. 4. In another embodiment of an inductive head, the pole tip regions 119 and 123 of the yoke structure comprise a multilayered structure consisting of a seed layer of sendust having a first composition and a bulk layer of sendust having a second composition as described above with reference to FIGS. 5 and 6. The seed layer can comprise a single layer of sendust or can be a multilayered structure consisting of alternating layers of gas-doped sendust and non-doped sendust.

Alternatively, in another embodiment of an inductive head, the back region layers 121, 125 and the portions of the pole tip layers 119, 123 remote from the ABS can be fabricated of a suitable magnetic material such as permalloy, for example, while only the pole tip portions 129, 131 in the gap 128 region exposed at the ABS are formed of the multilayered sendust structures described above with reference to FIGS. 4, 5 and 6. For example, pole tips 129 and 131 can comprise a structure having a seed layer of a first sendust composition and a bulk layer of a second sendust composition wherein the seed layer comprises either a single layer of sendust or a multilayered structure of alternating gas-doped sendust layers and sendust layers.

Figure 11:
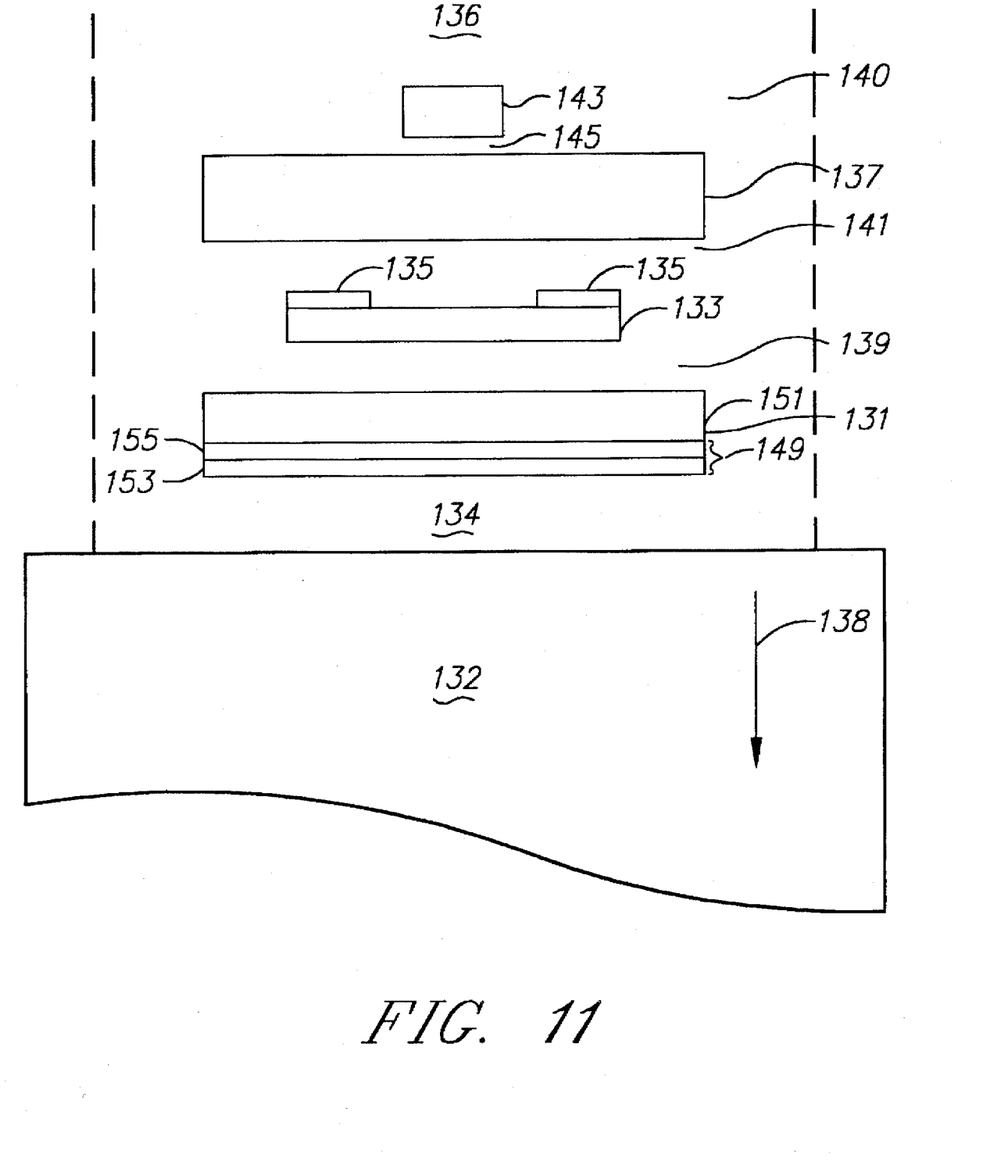
FIG. 11 is an elevation view of the air hearing surface of a merged MR-inductive head incorporating the multilayered magnetic structures according to the present invention.

Referring now to FIG. 11, a view of the ASS of a merged MR-read/inductive-write transducer 130 incorporating the multilayered sendust films according to the principles of the present invention is shown. A merged transducer as shown essentially comprises an MR read head and an inductive write head formed one on top of the other in such a manner that lower magnetic pole piece of the inductive head and the second or upper magnetic shield element of the MR head can be combined into a single shielding element. The merged MR-read/inductive-write transducer assembly 130 comprises a first shield member 131 which is separated from a substrate 132 by a nonconductive layer 134 of alumina, for example. Substrate 132 typically comprises the body of a slider which supports the transducer on the trailing edge thereof as shown in FIG. 3. A first nonmagnetic gap layer 139 is then deposited over the first shield 131 to serve as a base layer for deposition of the MR sensor element 133. Although MR sensor element 133 is shown as having a single layer, it will be apparent to those skilled in the art that additional layers for properly biasing the sensor, for example, may also be included. The MR sensor element is contacted by electrically conductive leads 135, which are isolated from the second shield member 137 by a second magnetic gap layer 141. The second shield member 137 comprises a single element which serves as both an upper shield for the MR sensor element 133 and as the lower pole piece for the inductive write head. The second shield member 137 is fabricated of a material having suitable magnetic and mechanical properties such as NiFe, fop example, as is known in the art. Then a layer of a nonmagnetic gap material and an upper pole piece having pole tip 143 are deposited over the lower pole piece and machined to the desired dimensions by ion beam milling or other suitable process forming magnetic gap 145. The inductive coil and remaining portions of the upper pole piece (not shown) are fabricated as is known in the art. A protective layer 136 is then deposited to a desired thickness at the trailing end of the transducer assembly.

The leading (with respect to the relative motion between the transducer and the storage media as indicated by arrow 138) first shield 131 comprises a multilayered thin film structure including a seed layer 149 of sendust of a first composition and a bulk layer 151 of sendust of a second composition as described above with reference to FIG. 5. Alternatively, the seed layer 149 comprises a multilayered structure of alternating layers of gas-doped sendust 153 of said first composition and of non-doped sendust 155 of said first composition as described above with reference to FIGS. 4 and 6.

While the present invention has been particularly shown and described with reference to preferred embodiments thereof, it will be understood by those skilled in the art that various changes in form and detail may be made therein without departing from the spirit, scope and teaching of the invention. Accordingly, the invention herein disclosed is to be considered merely as illustrative and limited in scope only as specified in the appended claims.

I claim:

1. A two-layer magnetic structure comprising:

a substrate;

a seed layer of a first silicon-aluminum-iron alloy having a first composition, said seed layer formed on said substrate and having a thickness in the range of 100 Angstroms to 800 Angstroms; and a bulk layer of a second SiAlFe alloy having a second composition, said first SiAlFe composition having different amounts by weight of its constituent components than said second SiAlFe composition, said bulk layer formed on said seed layer and having a thickness in the range of 0.3 to 10.0 micrometers.

2. A two layer magnetic structure as in claim 1 wherein said first SiAlFe alloy comprises an alloy having a composition, by weight, of 7.5 to 13.0 percent Si, 2.0 to 7.0 percent Al and the remainder Fe, said second SiAlFe alloy comprises an alloy having a composition of 7.5 to 13.0 percent Si, 2.0 to 7.0 percent Al and the remainder Fe.

3. A two layer magnetic structure as in claim 2 wherein said first SiAlFe alloy comprises approximately 9.6 percent Si, 6.0 percent Al and the remainder Fe.

4. A two layer magnetic structure as in claim 1 wherein said bulk layer comprises a sendust alloy having a near zero or negative magnetostriction.

5. A two layer magnetic structure as in claim 4 wherein said bulk layer comprises a SiAlFe alloy having a composition, by weight, of substantially 12.0 percent Si, 4.5 percent Al and the remainder Fe.

6. A two layer composition as in claim 4 wherein said bulk layer comprises a SiAlFe alloy having a composition, by weight, of substantially 11.5 percent Si, 5.0 percent Al and the remainder Fe.

7. A two layer magnetic structure as in claim 1 wherein said seed layer has a thickness of about 800 Å and said bulk layer has a thickness of about 1.9 micrometers.

8. A two-layer magnetic structure comprising:

a substrate;

a seed layer of a first silicon-aluminum-iron ("SiAlFe") alloy having a first composition, said seed layer formed on said substrate and having a thickness in the range of 100 Angstroms to 800 Angstroms, said seed layer uniformly doped with a selected gas; and A bulk layer of a second SiAlFe alloy having a second composition, said first SiAlFe composition having different amounts by weight of its constituent components than said second SiAlFe composition, said bulk layer formed on said seed layer and having a thickness in the range of 0.3 to 10.0 micrometers.

9. A two layer magnetic structure as in claim 8 wherein said selected gas comprises a gas selected from the group consisting of nitrogen, oxygen, water vapor, air, a mixture of nitrogen with oxygen and a mixture of nitrogen with oxygen and water.

10. A two layer magnetic structure as in claim 9 wherein said selected gas comprises nitrogen.

11. A two layer magnetic structure as in claim 8 wherein said seed layer has a thickness of about 320 Å and said bulk layer has a thickness of about 1.85 micrometers.

12. A two layer magnetic structure as in claim 8 wherein said bulk layer comprises a SiAlFe alloy having a negative magnetostriction.

13. A two layer magnetic structure as in claim 12 wherein said bulk layer comprises a SiAlFe alloy having a composition, by weight, of substantially 12.0 percent Si, 4.5 percent Al and the remainder Fe.

14. A two layer composition as in claim 12 wherein said bulk layer comprises a SiAlFe alloy having a composition, by weight, of substantially 11.5 percent Si, 5.0 percent Al and the remainder Fe.

* * * * *